United States Patent [19]
Lotz et al.

[11] Patent Number: 5,795,419
[45] Date of Patent: Aug. 18, 1998

[54] METHOD FOR ADJUSTING THE OPERATING FREQUENCY OF AN ORBITAL MOTION PRODUCING VIBRATORY WELDING SYSTEM

[75] Inventors: Wilfried Lotz, Neuberg; Heiko Priem, Brachtal-Hellstein; Gerd Reitmayer, Aschaffenburg, all of Germany

[73] Assignee: Branson Ultraschall Niederlassung der Emerson Technology GmbH & Co., Dietzenbach, Germany

[21] Appl. No.: 628,851

[22] Filed: Apr. 5, 1996

[30] Foreign Application Priority Data

Apr. 5, 1995 [DE] Germany .................. 195 12 820.6

[51] Int. Cl.⁶ ............................................. B32B 31/00
[52] U.S. Cl. .................... 156/64; 156/73.1; 156/350; 156/358; 156/580.1; 228/102; 364/477.06
[58] Field of Search ................ 156/64, 73.1, 73.2, 156/73.4, 350, 358, 580.1; 228/1.1, 102, 103, 110.1; 364/477.06

[56] References Cited

U.S. PATENT DOCUMENTS

| 4,606,490 | 8/1986 | Chan et al. ..................... 228/103 |
| 4,631,685 | 12/1986 | Peter ............................ 364/477.06 |
| 4,844,320 | 7/1989 | Stokes et al. ..................... 228/102 |
| 5,314,105 | 5/1994 | Farasssat ........................ 228/102 |

FOREIGN PATENT DOCUMENTS

| 498936 | 11/1991 | European Pat. Off. . |
| 504494 | 9/1992 | European Pat. Off. ........ B29C 65/06 |
| 4211279 | 4/1992 | Germany . |
| 2270868 | 3/1994 | United Kingdom . |

OTHER PUBLICATIONS

JP56–17196 (A) In: Patents Abstracts of Japan, M–66, Apr. 30, 1981, vol. 5, No. 65.

*Primary Examiner*—David A. Simmons
*Assistant Examiner*—Paul M. Rivard
*Attorney, Agent, or Firm*—Emrich & Dithmar

[57] ABSTRACT

The invention relates to a method for adjusting the operating frequency of a vibratory welding system producing orbital motion comprising a workpiece socket head which is mounted to resilient means. The head is driven by electromagnetic means to produce orbital vibrations to be constricted to a vibratory plane for welding workpieces, in particular made of plastic material, wherein the frequency is varied within a predetermined range of frequencies to detect the geometrical configuration of the vibration, followed by selecting the frequency exhibiting the best possible vibratory configuration and defining the operating frequency to which the system will be adjusted.

7 Claims, 6 Drawing Sheets

FIG. 8

METHOD FOR ADJUSTING THE OPERATING FREQUENCY OF AN ORBITAL MOTION PRODUCING VIBRATORY WELDING SYSTEM

BACKGROUND OF THE INVENTION

The present invention relates to a method for adjusting the operating frequency of a vibratory welding system producing orbital motion as well as an apparatus for performing the method.

In contrast to vibratory welding systems operating in a linear fashion, welding systems producing orbital vibrations do not exhibit a clearly marked direction of vibration. In view of the structural implementation of orbital systems, the vibrations take place in a vibratory plane. Depending on manufacturing clearances and asymmetric mass distribution a plurality of, generally two, preferred directions of vibrations result. The different directions of vibrations correspond to different resonant frequencies. Actually, two resonant frequencies result when welding rectangular geometrical designs, according to which the vibratory head tends to vibrate in a linear fashion in the direction of the longitudinal as well as the transverse axis. In the range between both resonant frequencies there is a transitory range where the vibratory head changes the motional direction from a linear transverse vibration towards a linear longitudinal vibration, i.e. the vibratory head performs an elliptical or, respectively, circular vibration.

An advantage provided by the orbital vibratory system is due to the possibility of performing a circular or at least elliptical vibration. Because of the harmonic motion (the vibratory head does not come to a stop in reversing, furthermore a substantially constant welding speed), the best possible welding results and/or the shortest welding times are obtained. By virtue of the harmonic motion the energy transfer of orbital systems is higher and more uniform than provided by linear systems.

However, the most favorable geometry of motion is difficult to adjust as the operator is required to have good knowledge of and experience with the system. Without closely observing the configuration of vibratory motion in using appropriate measuring means, the operator cannot determine and adjust a proper circular or elliptical motion resulting from an appropriate frequency which generally is not a resonant frequency.

SUMMARY AND OBJECTS OF THE INVENTION

It is an object of the present invention to provide a method allowing to adjust an optimum operating frequency of an orbital vibratory welding system in a simple manner.

The method according to the invention allows to adjust the optimum operating frequency required when tools of the orbital vibratory welding machine will be changed and/or when workpieces have to be welded having a different geometrical design.

Adjusting the vibratory motion is performed in three steps. Initially, the power source is controlled to run through a preselected frequency range, starting from the lowest frequency in a search of finding the absolute current minimum or power minimum of the vibratory circuit. This minimum corresponds to the most clearly marked resonant frequency which, however, does not correspond to a circular motion.

Thereafter, the frequency is varied towards higher frequencies starting out from this resonant frequency, and the resulting configuration of the orbital motion is recorded. The optimizing characteristic is defined by the ratio between the short and the long half axis of the elliptical path. When this ratio becomes unity, this means that the welding head moves in a perfect circle. However, when the ratio becomes worse after having started the measuring procedure, an optimum circular motion cannot be expected anymore to occur towards higher frequencies, and the search is continued towards lower frequencies. Thus the search results in determining the best possible or optimum circular motion within the predetermined range of frequencies. According to the definition used herein, a circular path is at an optimum when the amplitudes of the long and the short elliptical half axis lie together as closely as possible. Depending on the respective application and masses this might be even an elongate ellipse or a straight line. The best possible frequency will be then adjusted by the system.

In a third step, the system checks whether or not the determined frequency results in a stable motion, or whether or not the motion varies (wobbling of the circular path, varying the radius and so on). When the motion is not stable, the frequency of the current minimum will be delivered to be memorized as the operating frequency.

The tuning procedure referred to is based on the fact that the motion in the idle condition (i.e. there is no welding of the plastic workpieces) and the motion under load (welding) are identical. In many cases this condition is met and thus the automatic adjustment will be then terminated.

In response to a number of parameters (high engaging pressure while welding, large changes of the characteristics of the material during welding and so on) it is possible that the predetermined frequency does not result anymore in the optimum shape of motion when the system is under load. In this case the tuning procedure should be repeated under load.

In welding workpieces having a particular geometry restricting the motion in one of the axes, the best possible circular motion which has been determined would not be considered to be an appropriate motion. In this case the tuning criteria will be varied, i.e. instead of searching for the best possible circular configuration, one selects a motion having an appropriate, but different configuration (an elongate ellipse or linear motion, for example) and the tuning procedure in the idle condition or under load is performed by applying the search criteria as varied.

According to the invention, an optimum operating frequency can be thus determined for each and any welding geometry, generally using a circular or elliptical vibration which, however, may be varied to be an elongate ellipse or even a straight line.

Other objects will become more readily apparent from a review of the following description which makes reference to the accompanying drawings.

Figure 7:
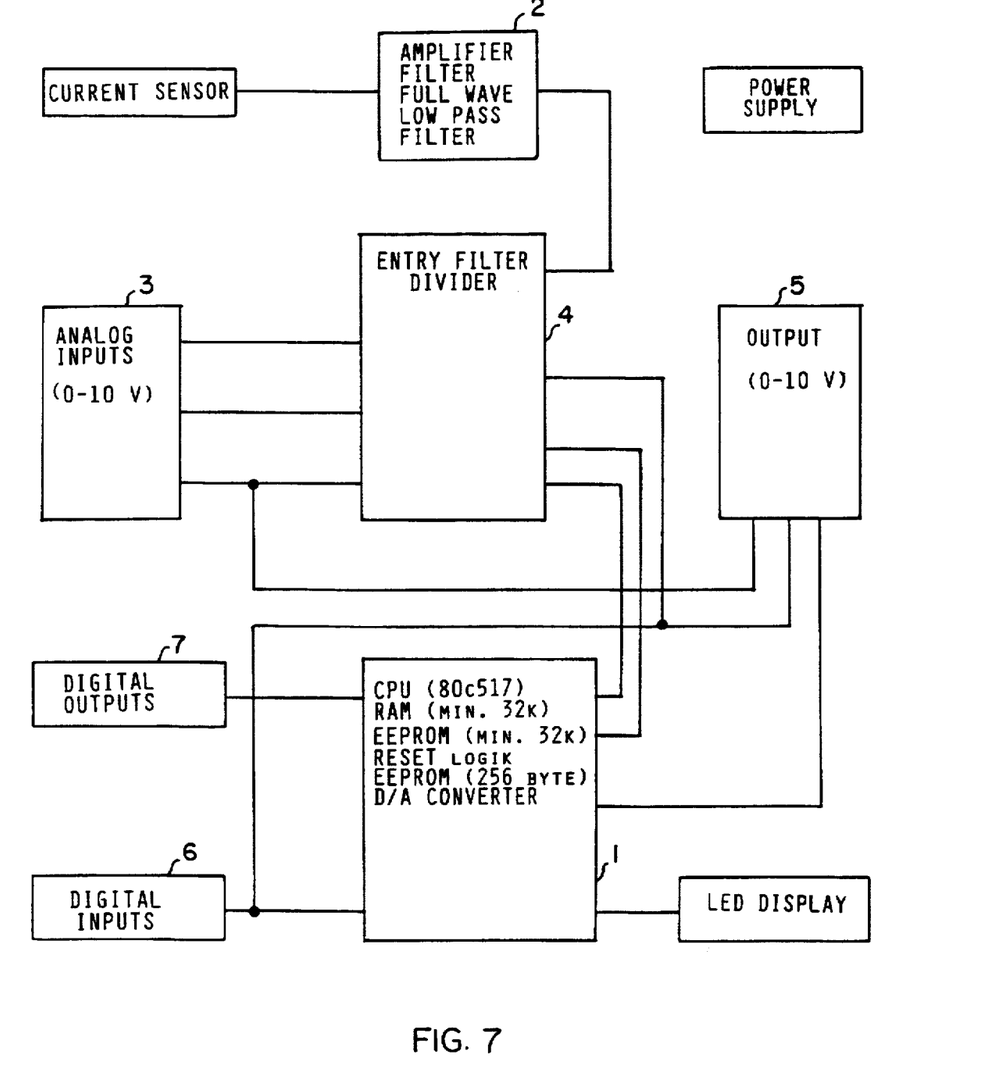
FIG. 7 is a schematic diagram of a preferred embodiment of a circuitry according to the invention.

A preferred embodiment of a circuitry according to the invention is illustrated in a schematic diagram.

Referring to FIG.7, an intelligent unit is defined by a micro controller or a processor 1 of similar capacity. The signal of a current sensor or power sensor is delivered to the processor 1 through an amplifier 2. A sensor (not shown) measures the current passing through the winding of an electromagnetic drive system of an orbital welding machine (not shown). An embodiment of a vibratory welding machine of this type is disclosed in FIGS. 1–5. The operating frequency may be tuned to the resonant frequency of the system by determining the phase angle between the voltage and the current of the electromagnetic drive,which angle becomes zero in the resonant condition.

Figure 1:
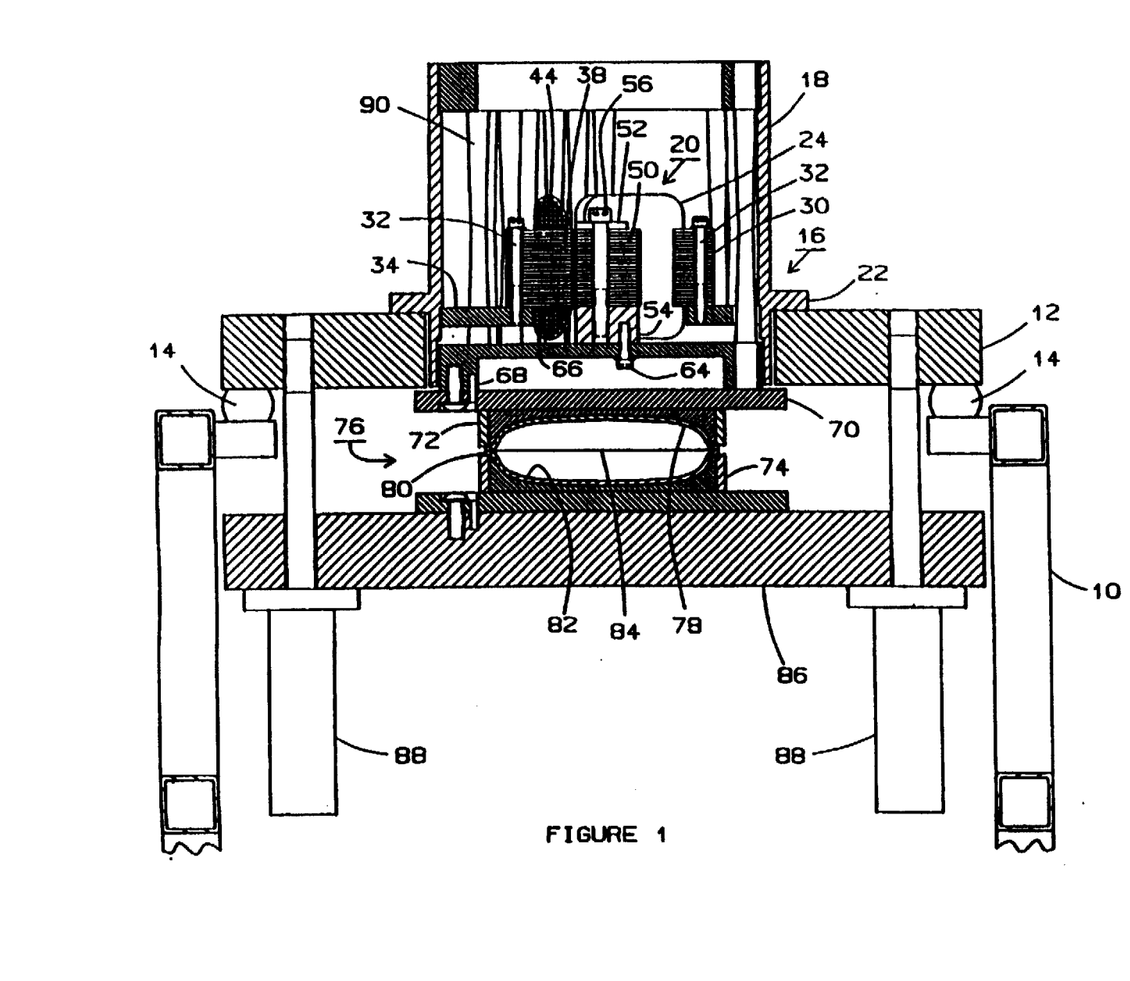
FIG. 1 is a sectional front view of a friction welder embodying the invention; the section being taken along the line 1—1 in FIG. 2.
Figure 2:
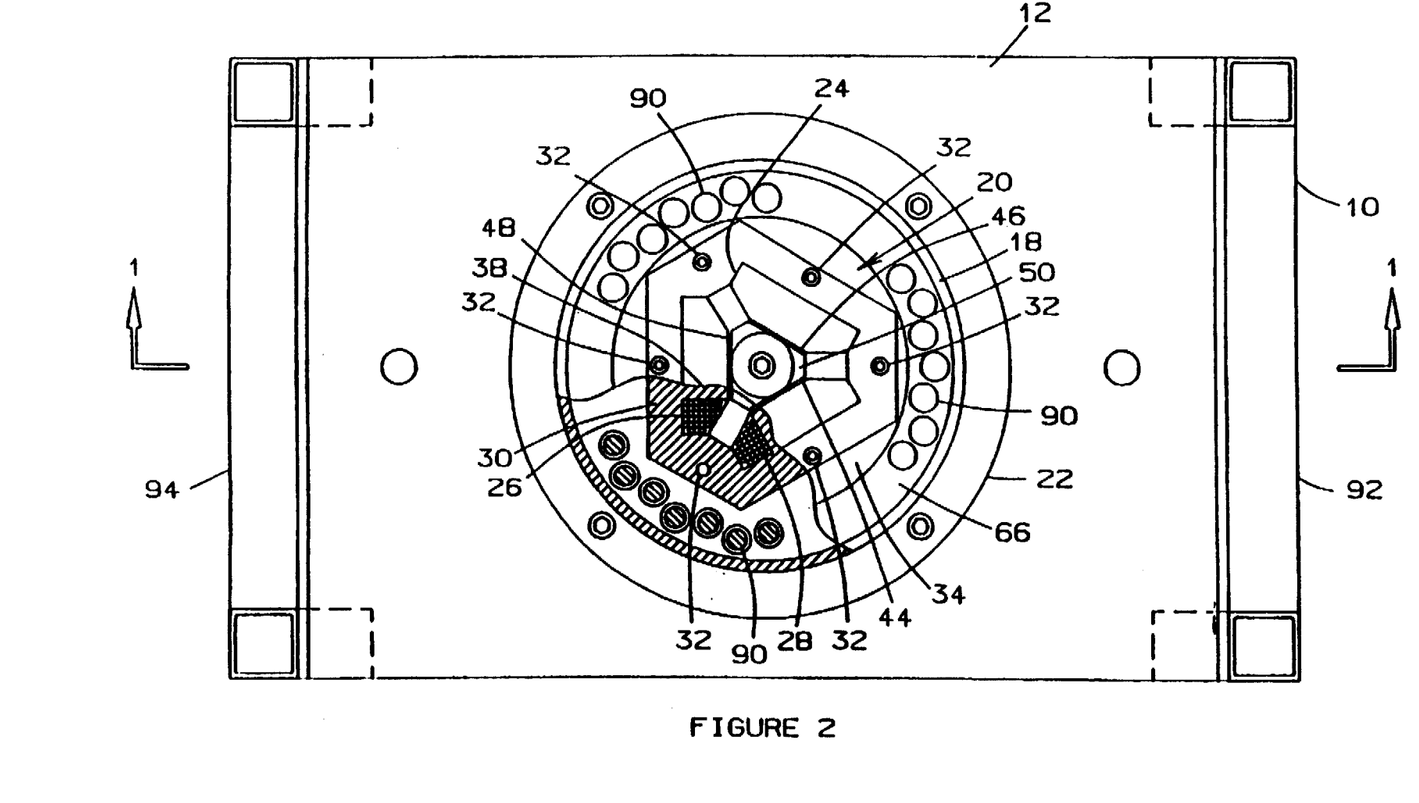
FIG. 2 is a plan view of the welder shown in FIG. 1 partially broken away to illustrate the electromagnetic drive motor and the support which provides orbital motion in an orbital plane in greater detail.

Referring more particularly to FIGS. 1 and 2, there is shown a framework 10 of a friction welder made up of steel tubes. A massive support plate 12 is mounted on vibration isolation or shock mounts 14, thereby mounting the plate 12 and the rest of the welder on the framework 10. The mass of the plate 12 is desirably much greater than the mass of the moving parts of the system, and for example, may be 200 pounds as compared to the mass of the moving parts which may be approximately 25 lbs. The plate 12 may for example be steel 2 inches in thickness and 20 inches in diameter. The sizes mentioned are for an exemplary welder. It will be appreciated that the electromagnetic orbital drive may be made smaller, if desired, so as to enable the construction of reduced scale vibration welders, much smaller than vibration welders of the type presently commercially available and as described in the above-referenced patents. For example, the weld head 16 of the welder may be reduced in size to a size comparable of ultrasonic welding heads. Where higher force output is desired, a plurality of drivers which provide forces which add may be used.

The weld head includes a tubular structure 18 having an opening in which the electromagnetic driver or motor 20 is contained. A flange 22 connects the tubular structure to the massive support plate 12.

Figure 8:
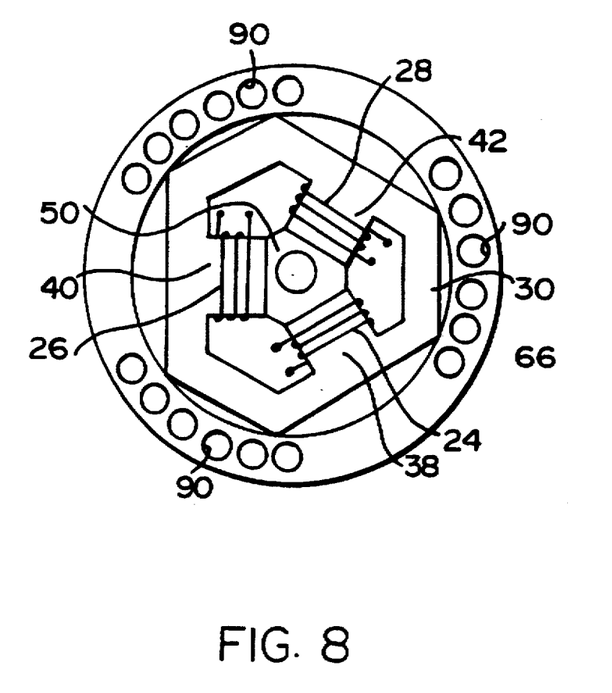
FIG. 8 is a schematic view of an orbital drive motor.

The motor 20 is adapted to be driven by three phase AC power applied to electromagnetic means, in the form of coils 24, 26 and 28, on a stator 30. (See also, FIGS. 3 and 8.) The stator 30 is a single body of magnetic material made up of laminations of steel of the type used in electric motors which are disposed in a stack mounted by bolts 32 on a ring 34 which is attached, as by welding to the tubular structure 18. The stator 30 is generally triangular in cross section with the apexes of the triangular shape cut off for conservation of material and space. The stator defines a ring which affords a magnetic return path for flux generated by the coils. Poles 38, 40 and 42 around which the coils 26, 28 and 24, respectively are wound, project inwardly towards a central axis which is defined by bisectors of each angle of the triangular shape; the triangular shape being equilateral. The coils may be wound in two sections and connected together for ease of installation. While it is preferable to use coils disposed around the stator poles 44, 46 and 48 as shown, the coils may be wound around the sections of the corners of the stators where the bolts 32 are shown. In a typical motor, the area of the faces 44, 46 and 48 of the stator poles may be approximately 3 square inches. The number of turns in a typical motor may be 200. The motor has an armature 50, which like the stator, is a single body of magnetic material made up of a stack of laminations which are clamped between a washer 52 and a stub 54 by a bolt 56.

The armature is generally triangular in cross-section and has pole faces along each of its sides (sides of an equilateral triangular shape). These faces 58, 60 and 62 (see FIG. 3) are opposed to and separated by air gaps from the stator pole faces 44, 46 and 48, respectively. The width of each gap may, for example, be 0.050 inches. All of the pole faces and the gaps are symmetrically disposed about the central axis of the armature. This axis is the longitudinal, central axis of the bolt 56. The width of the gap is desirably greater than the peak orbital motion of the armature, which may for example be 0.021 inches, so that the armature does not strike the stator.

The armature is connected by bolts, one of which 64 is shown in FIG. 1, to a drive plate 66 which may be circular and have a tubular flange 68 which is bolted to the platen 70 of the welder. This platen is connected to an orbitally moveable part 72 of a tool or fixture 76 which carries one of the parts 78 which is to be welded at weld flanges 80 to another part 82. The weld flanges have weld surfaces which define the interface 84 of the parts. The parts may be of thermoplastic material. The lower part 82 is fixedly held in the lower section 74 of the tool or fixture 76. This lower half is mounted on a clamp plate 86 which is reciprocated vertically by hydraulic cylinders 88 so that the parts can be clamped together at the interface with sufficient force that when the upper part 78 is moved orbitally by the motor 20 heat is generated which causes melting to take place at the interface.

In order to prevent tilting of the armature 50 at the interface, (causing loss of contact of the weld surfaces and reduced frictional forces which are developed as the upper weld part 78 executes orbital motion) the armature 50 and hence the upper part 78 is maintained in a horizontal orbital plane as shown at 84. This is accomplished by a flexural, spring support system for the armature 50, the drive plate 66 the platen 70 and the fixture part 72 which is attached thereto. This flexural support is provided by resilient means in the form of a symmetrical array of rods 90 mounted outboard of the stator—armature system to stabilize the platen motion and maintain the orbital forces in the orbital plane. These rods are elements which provide equal stiffness in the direction around their axes (i.e., parallel to the orbital plane). Circumferentially adjacent ones of the rods 90 are staggered so that alternate rods are radially, closer and further from the axis of the motor 20. This arrangement provides a constraint against tilting motion out of the orbital plane. The array also defines stiffness which with the mass of the orbitally moveable parts (the armature 50 and the fixture part 72 and the parts connected thereto) is a mechanical system resonant at the frequency of orbital motion. This is twice the frequency of the Ac power which is applied to the coils 24, 26 and 28 on the stator poles 38, 40 and 42. The frequency motion is doubled because the electromagnetic forces are proportional to the square of the flux in the air gaps between the pole faces and therefore are proportional to the square of the voltage applied to the coils. It will be appreciated that orbital motion occurs because the forces on the armature are generated by the three phase flux which, because of frequency doubling, is 60 out of phase at each of the poles. At any point in the orbital plane this force produces motion which can be resolved into displacement, velocity or acceleration vectors which are in the same direction and can each be represented by vectors (parallel to the orbital plane or, in other words, perpendicular to the orbital axis) and are proportional in amplitude to the sine and cosine of twice the AC power line frequency (i.e., these vectors rotate at twice the frequency of the AC power). As discussed above, orbital motion is expressed mathematically in terms of position coordinates x, y and z in the xy orbital plane (z=0 in the orbital plane and has a finite value to denote orbital planes parallel thereto); where $x_o$ and $y_o$ are measured at an arbitrary origin in the orbital plane; xo, yo and $z_o$, are positional coordinates at rest; t is time and seconds and is radial frequency in radians per second, the motion in the orbital plane is $x(t)=x_o+A \sin \omega t$ and $y(t)=y_o+B \cos \omega t$. When A and B in the equations for x(t) and y(t) are different, the orbital motion is elliptical. Throughout the orbital plane(s), the motion remains the same (the displacements, velocity and acceleration vectors are constant) irrespective of the distance in the plane from any arbitrary origin to a point where the orbital motion is observed.

Figure 3:
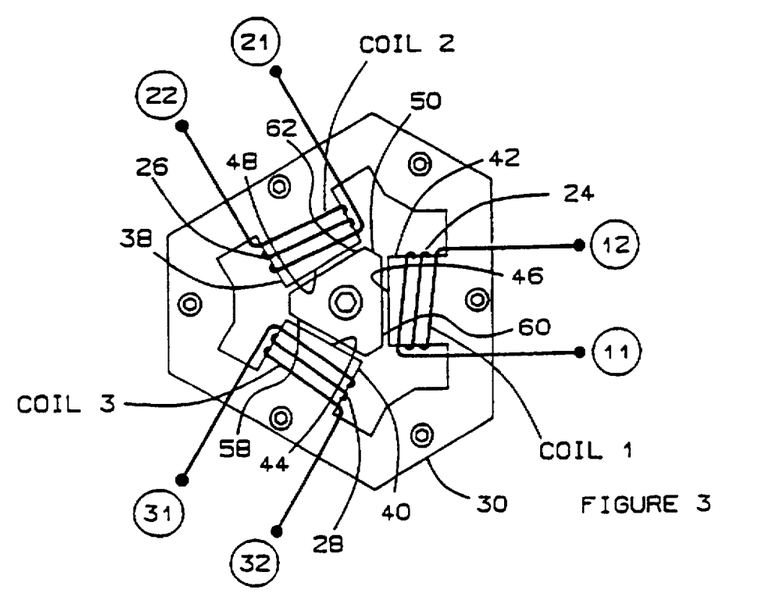
FIG. 3 is a more detailed diagram illustrating the orbital drive motor and the connections of the coils thereon, the coils being shown schematically in the Figure.
Figure 4:
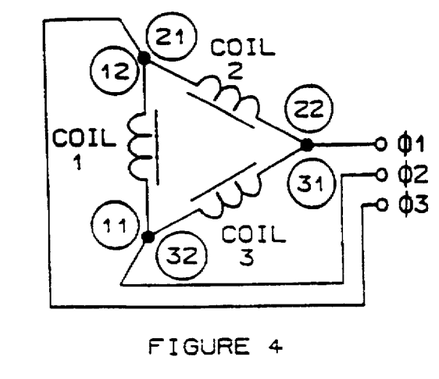
FIG. 4 is a schematic diagram illustrating delta wiring of the coils of the orbital motor for full output and minimal current distortion.
Figure 5:
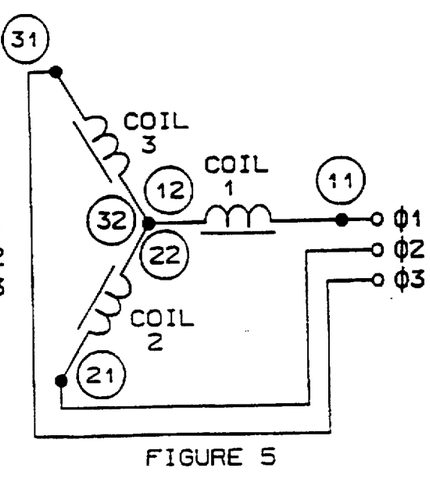
FIG. 5 is a schematic diagram showing why wiring of the coils of the electromagnetic orbital motor which provides one-third the output force of the delta connected coil configuration shown in Fig.4.

Referring to FIGS. 3, 4 and 5, it will be seen that the coil 24 is designated as "coil 1.," the coil 26 is designated as "coil 2" and the coil 28 is designated as "coil 3." These coils may be connected in delta with the ends of the windings indicated by the numerals within circles connected together as shown in FIG. 4 and the ends of the delta connected coils connected to the three phase power lines indicated as ø1, ø2 and ø3. Alternatively, and if less force is desired than for delta wiring, the coils may be connected in wye configuration as shown in FIG. 5. In wye mode, the force output is one-third the force output with delta connection and the current drawn from the lines is also reduced by one-third. The delta connection at resonance has a third harmonic of coil current which is 16 dB below the fundamental of the AC current, while the current from the AC drive has a fifth harmonic 28 dB below the fundamental. It is therefore seen that the delta connection reduces the harmonics in the current from the AC drive.

Figure 6:
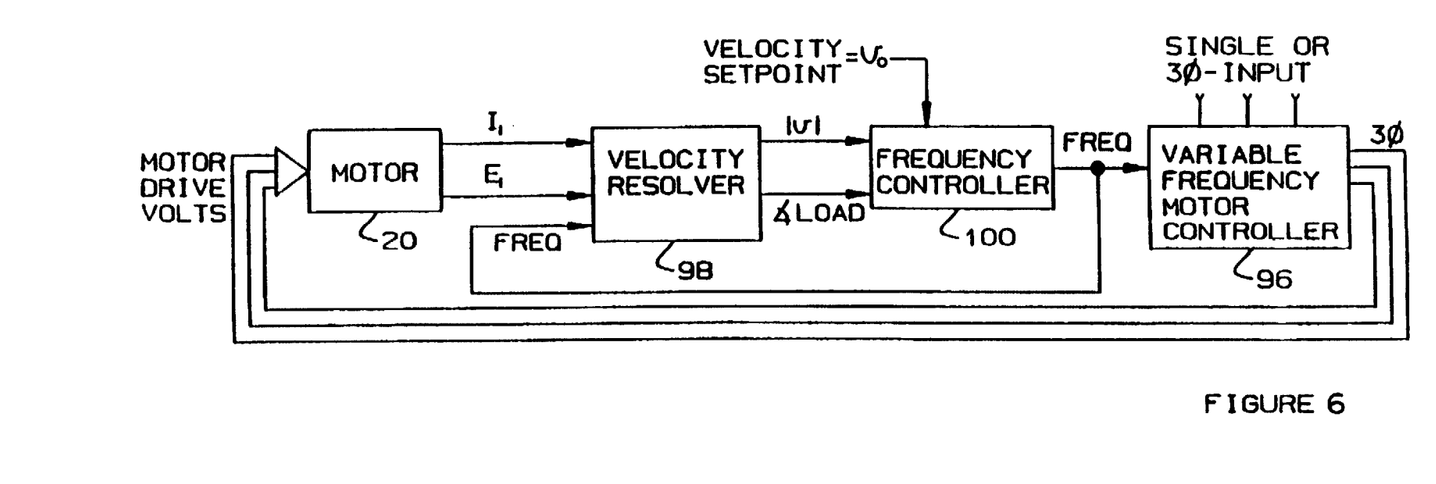
FIG. 6 is a block diagram, schematically show in a velocity control system for the electromagnetic orbital/vibrational motor illustrated in the preceding figures.

Referring to FIG. 6, there is shown a velocity control system for the electromagnetic orbital drive motor illustrated in the preceding figures.

Preferably, the current signal is directly sensed at the electrical coils of the electromagnetic drive means in order to determine the power minimum as directly as possible.

The geometry of the motion will be detected by one or a plurality of sensors recording the motion, the sensors being sensitive to the direction of the motion. This can be accomplished by using a pair of acceleration sensors, for example, which are mounted at 90° with respect to each other in the plane of the orbital motion. Based on both the signals, the processor calculates the motion of the vibratory system. For a circular motion both signals have the same amplitude and have a phase off-set of 90°. Referring to the diagram, these signals are referred to as analog inputs 3. The signals will be processed in an input filter 4 and then supplied to the processor 1.

The processor delivers commands required for passing through the selected band of frequencies, further commands the vibratory amplitude to be used and/or transmits the determined operating frequency after the adjustment has been made through an output 5 to a frequency converter (not shown) driving the electromagnetic drive system of the vibratory head. Accordingly, the desired frequency for the drive system is transmitted as a voltage signal.

Through digital inputs 6 and outputs 7 the processor 1 communicates with a machine controller for example a Programable logic Control or Speicher Programmierte Steuerung ("SPS"). This makes it possible to supply parameters (range of frequencies, searching procedure etc.) through units operating the machine. Furthermore, the determined parameters are supplied to the SPS which in turn controls the machine. Optionally the parameters may be read out and further processed. Furthermore, sign-on messages and messages relating to errors are transmitted to the SPS.

The tuning system separately implemented with respect to the SPS makes it possible to control the machine which has been not tuned merely manually or through the SPS. In this case the control will be deactivated through a digital input.

One or more of the directional sensitive sensors utilized, for example an accelerator sensor can be also used for controlling the amplitude during the tuning and welding procedure. A separate sensor system for controlling the amplitude will be thus not required.

I claim:

1. In a method for adjusting the operating frequency of an orbital vibratory welding system including a welding head receiving a workpiece, resilient means to which the head is mounted and electromagnetic means for driving the head which is subjected to orbital vibrations having a geometrical configuration constricted to a vibratory plane, the improvement comprising the steps of: varying the operating frequency in a predetermined range of frequencies, sensing the geometrical configuration of the orbital vibrations, and selecting an optimum frequency resulting in an optimum geometrical configuration of the orbital vibrations and adjusting the operating frequency of the welding system to the optimum frequency.

2. The method of claim 1 wherein the step of varying the operating frequency includes varying the frequency in a predetermined frequency range until a resonant frequency associated with a current minimum or power minimum is detected, and varying the operating frequency towards at least one of higher and lower values starting from said resonant frequency, while measuring the geometrical configuration of the orbital vibration.

3. The method of claim 1 or 2, and further comprising the step of determining whether or not a stable vibratory configuration results for the operating frequency which has been selected and adjusted, and the step of selecting and adjusting the resonant frequency for a non stable vibratory configuration.

4. The method of claim 1, wherein the optimum geometrical configuration is defined by a best possible circular configuration or elliptical configuration or by a linear vibratory configuration depending on the workpiece geometry.

5. In an orbital vibrating welding system including a welding head receiving a workpiece, resilient means to which the head is mounted, electromagnetic means including current windings for driving the head into orbital vibrations having a geometrical configuration constricted to a vibratory plane, and a controller coupled to the electromagnetic means, the improvement comprising:

first sensing means for sensing the geometrical configuration of the orbital vibrations of the head, second sensing means for sensing the current in the windings, and a processor operating under stored program control and coupled to the controller and to said first and second sensing means for supplying to the controller output voltage signals for causing the controller to adjust the frequency of the current in the electromagnetic means to a predetermined frequency corresponding to an optimum geometrical configuration of orbital vibrations.

6. The apparatus of claim 5, wherein said processor includes means for varying the frequency of the current in the electromagnetic means in a predetermined frequency range until a resonant frequency associated with a current minimum or power minimum is detected, and varying the operating frequency toward at least one of higher and lower values starting from said resonant frequency, while measuring the geometrical configuration of the orbital vibrations.

7. The welding system of claim 5, wherein said processor includes means for determining whether or not a stable geometrical configuration results for the operating frequency, and selecting and adjusting the resonant frequency for a non-stable vibratory configuration.

* * * * *